United States Patent [19]

Muszynski

[11] Patent Number: 5,069,255

[45] Date of Patent: Dec. 3, 1991

[54] PIPELINE CASING INSULATOR

[75] Inventor: Larry C. Muszynski, Houston, Tex.

[73] Assignee: Power Lone Star, Inc., Englewood, Colo.

[21] Appl. No.: 493,944

[22] Filed: Mar. 15, 1990

Related U.S. Application Data

[63] Continuation of Ser. No. 225,926, Jul. 29, 1988, Pat. No. 4,928,736.

[51] Int. Cl.⁵ .............................................. F16L 9/14
[52] U.S. Cl. .................................. 138/149; 138/110; 138/113; 138/114; 138/148
[58] Field of Search ............... 138/111, 113, 114, 148, 138/149, 178, DIG. 6, 108, 97, 98, 110; 428/68, 76, 105, 114, 141, 150, 167, 108, 323, 325, 409

[56] References Cited

U.S. PATENT DOCUMENTS

| | | | |
|---|---|---|---|
| 192,474 | 6/1877 | Wiestling | 138/148 |
| 2,735,449 | 2/1956 | Grahame | 138/113 |
| 2,782,804 | 2/1957 | Bond | 138/113 |
| 3,117,902 | 1/1964 | Holzheimer | 138/149 |
| 3,557,840 | 1/1971 | Myabee | 138/149 |
| 3,619,474 | 12/1971 | Beck | 138/113 |
| 3,692,619 | 9/1972 | Wedekind et al. | 138/98 |
| 4,351,365 | 9/1982 | Bauermeister et al. | 138/149 |

Primary Examiner—James E. Bryant, III
Attorney, Agent, or Firm—Darby & Darby

[57] ABSTRACT

A pipeline casing insulator to support a coated pipe within a tubular, metallic casing. The pipeline casing insulator comprises a flexible belt formed of a material that is capable of bonding to an organic resin. A plurality of parallel bar-like runnners are formed fron an insulative and non-abrasive polymer concrete that is cast onto an outer facing surface of the belt. The belt is preferably a strip of an organic non-woven material. The polymer concrete is preferably a mixture of a thermosetting polymer resin, such as epoxy, polyester or polyrethane, and an aggregate. The aggregate preferably comprises a mixture of substantially incompressible coarse particulate material, such as sand or gravel, and fine filler material, such as calcium carbonate, silica flour, or kaolin. The inner facing surface of the belt preferably has a mastic coating covered by a release paper that can be removed, to allow attachement of the belt to the outer surface of the pipe by circumferentially wrapping the belt around the pipe.

10 Claims, 1 Drawing Sheet

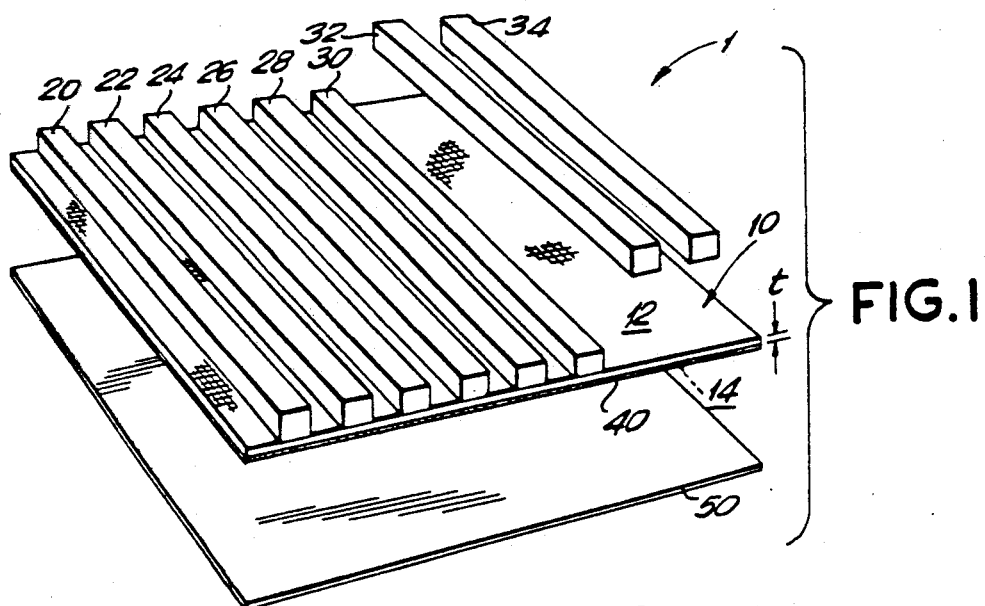
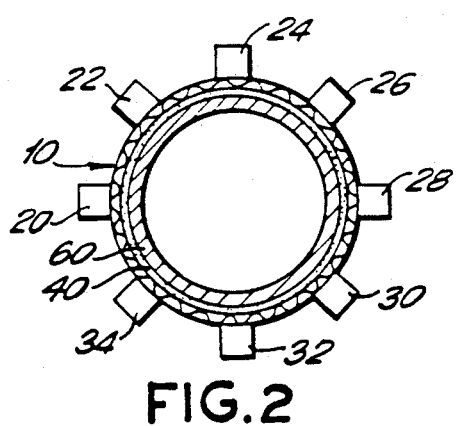
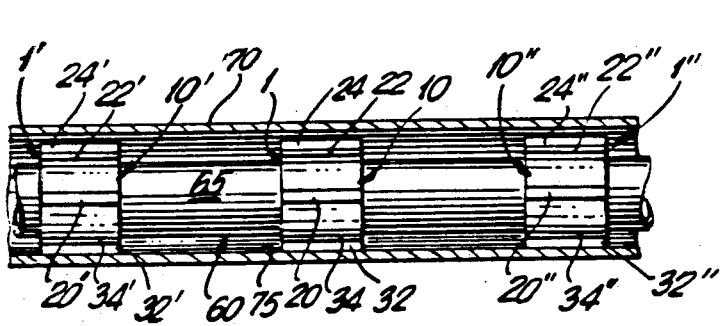
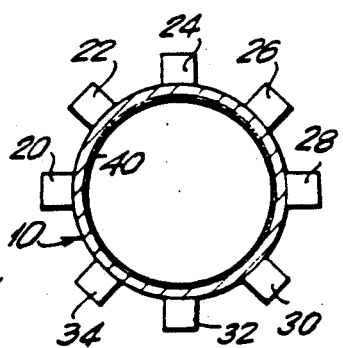
FIG.1
FIG.2
FIG.3
FIG.4

PIPELINE CASING INSULATOR

This is a continuation of application Ser. No. 225,926, filed July 29, 1988, now U.S. Pat. No. 4,928,736.

FIELD OF THE INVENTION

The present invention relates to a pipeline casing insulator that supports a coated pipe within a tubular metallic casing to electrically insulate the pipe from the tubular casing and to prevent damage to the coated surface of the pipe when the pipe is installed within the casing.

BACKGROUND OF THE INVENTION

The outer surface of steel pipe, when used in an outdoor application, is generally provided with a corrosion resistant coating, such as fusion bonded epoxy. When the pipe is buried in the ground, for instance, at underground road crossings, the pipe is generally further protected by being enclosed within a tubular metallic casing. The pipe is supported within the casing by a pipeline casing insulator. The casing insulator, in addition to its supportive function, electrically insulates the pipe from the casing. This insulative function is necessary for the cathodic protection of the pipe, and also, for preventing current loss when the pipe is used as a conduit for electrical cables. Furthermore, the casing insulator prevents damage to the outer coated surface of the pipe when the pipe is drawn through the casing during installation.

The prior art pipeline casing insulators include a rigid steel band that encircles the outer coated surface of the pipe. The inner surface of the band is lined with an electrically insulating, oil resistant, rubber liner that contacts the coated surface of the pipe. A plurality of runners are connected to the outer surface of the band to support the pipe within the casing. The band is formed from a pair of sections that are bolted together to connect the band to the pipe. An example of a prior art pipeline casing insulator, as generally described above, is illustrated in Pipeline Casing Insulators, Casing End Seals and Wall Penetration Seals, Section 100, Bulletin No. 14825 12/85, Maloney Pipeline Products Co. of 5200 Cedar Crest, Houston, Tex. 77087.

As can be appreciated, the band, the rubber liner, the runners and the mounting hardware are provided as separate components that are relatively expensive and that require time consuming field assembly. Moreover, the metallic components of the prior art casing insulator can damage the integrity of the corrosion resistant coating during assembly.

The present invention provides a pipeline casing insulator that is less expensive than the prior art casing insulators and that, also, requires no field assembly. A casing insulator fabricated in accordance with the present invention accomplishes these advantages by utilizing a flexible belt of, preferably, an organic non-woven material, in place of the rigid band and liner structure of the prior art, and a plurality of elongated runners that are preferably formed from a polymer concrete that is cast directly onto the band. In a preferred embodiment, the belt is connected to the pipe by a precoating of mastic that is applied to one of the surfaces of the belt. The mastic, prior to installation, is covered by a release strip which is removed when attaching the belt to the pipe. As is evident, this structure is inexpensive to manufacture and requires no extensive assembly. Additionally, the structure contains no metal parts that could damage the pipe coating during attachment.

SUMMARY OF THE INVENTION

The present invention provides a pipeline casing insulator that supports a coated pipe within tubular metallic casing. The pipeline casing insulator of the present invention comprises a flexible belt, a plurality of runners and means for connecting the belt to the pipe.

The flexible belt includes a pair of opposed, spaced inner and outer facing surfaces that are separated by the thickness of the belt. The length of the belt is sized such that the belt may be mounted on the pipe by circumferentially wrapping the belt around the outer surface of the pipe with the inner facing surface abutting the outer coated surface of the pipe.

Each of the bar-like runners comprises a hardened casting that is formed from an insulative material. The runners are mounted on the outer facing surface of the belt and are arranged in an array that surrounds the pipe when the belt is mounted on the pipe to support the pipe within the casing and to prevent the outer surface of the pipe from contacting the inner surface of the casing.

DESCRIPTION OF THE DRAWINGS

In the accompanying drawings:

FIG. 1 is an exploded perspective view of a pipeline casing insulator of the present invention.

FIG. 2 is a cross-sectional view of the pipeling casing insulator illustrated in FIG. 1, installed on a pipe.

FIG. 3 is a fragmentary cross-sectional view of a set of pipeline casing insulators of the present invention supporting a pipe within a casing.

FIG. 4 is a cross-sectional view of the pipeline casing insulator, illustrated in FIGS. 1, 2, and 3, in a mounted configuration.

DETAILED DESCRIPTION

With reference to the figures, the present invention provides a pipeline casing insulator 1. With reference to FIG. 1, the pipeline casing insulator 1 preferably includes a flexible belt 10, a plurality of elongated parallel, bar-like runners 20–34 and a coating of mastic 40 which, prior to use, is covered by a release paper 50. With reference to FIGS. 2 and 4, the flexible belt 10 is mounted on a pipe 60 by removing the release paper 50 and circumferentially wrapping the belt 10 about the outer surface 65 of the pipe. As such, there is no extensive field assembly required when using a pipeline casing insulator that is fabricated in accordance with the present invention.

Having generally described the invention, a more detailed description begins with a description of the flexible belt 10. With reference to FIG. 1, the flexible belt 10 includes a pair of opposed, spaced inner and outer facing surfaces 12 and 14 separated by the thickness "t" of the belt 10. As can best be seen in FIG. 2, the belt 10 has a length sized such that the belt 10 may be mounted on the pipe 60 by circumferentially wrapping the belt 10 around the pipe 60 with the inner facing surface 14 abutting the outer surface 65 of the pipe 60. The belt 10, for reasons that will become apparent, is preferably fabricated from a material that is capable of bonding to an organic resin. The belt 10 of the preferred embodiment is preferably a strip of non-woven material, such as polypropylene, polyester, and woven fiberglass from about 0.05 to 0.23 cm. thick.

With reference to FIGS. 1 and 2, each of the runners 20-34, comprises a hardened casting that is formed from a material that, when in a plastic state, is capable of bonding to the belt 10. As such, the runners 20-34 are connected to the belt 10 by being cast directly onto the outer facing surface 12 of the belt 10 in a transverse orientation of the belt and in an array that surrounds the pipe 60 when the belt 10 is mounted on the pipe 60. As illustrated in FIG. 3, the array of runners 20-34 supports the pipe within the casing 70 and prevents the outer coated surface 65 of the pipe from contacting the inner surface 75 of the casing 70. As is known by those skilled in the art, a series of pipeline casing insulators are ordinarily used to support the pipe within the casing. Thus, as illustrated in FIG. 3, casing insulators 1' and 1" are used in conjunction with the casing insulator 1 described in detail herein. Casing insulators 1' and 1" are identical to the casing insulator 1 and, as such, are provided with belts 10' and 10" that are identical to belt 10 and runners 20'-34' and 20"-34", that are identical to runners 20-34.

The material forming the runners 20-34 preferably is a polymer concrete that comprises a mixture of an organic resin that acts as a cementing agent, and an aggregate. The polymer concrete or any other material used is non-abrasive so as to prevent the runners from marring the inner surface 75 of the casing 70 when the pipe 60 is installed. Additionally, the polymer concrete or other material should also be electrically non-conductive or insulative for the reasons that have been mentioned previously. The organic resin is preferably a thermosetting polymer. The resin utilized can be, for example, an epoxy, polyester, or polyurethane. The aggregate can preferably be a mixture of coarse particles of a substantially incompressible material, such as sand or gravel, and fine particles of a filler material, such as calcium carbonate, silica flour, or kaolin. The concrete mixture may be polymerized either thermally or by chemical activators. The ratio, by weight, of the incompressible particulate material to the filler material is preferably about 0 to 50%. The ratio, by weight, of the total aggregate to the resin is preferably about 50% to 80%.

The mastic coating 50 is applied to the inner facing surface 14 of the belt 10 together with its release paper 50. The mastic 40 is preferably asphalt, modified asphalt, or butyl rubber. It is understood however that the mastic 40 and the release paper 50 could be omitted in accordance with the present invention. For example, a mastic coating could be applied in the field. In any embodiment, when adhesives are used to attach the belt 10 to the pipe 60, the particular adhesive should be compatible with the coating of the pipe to allow for the proper bonding of the belt 10 to the pipe.

The casing insulator 1 is preferably formed from a roll of material that is cut to size in the field. Although not illustrated, but as could be appreciated by those skilled in the art, the roll would include a plurality of runners cast onto a long sheet of fabric. The mastic coating and the release paper would have been applied to the underside of the sheet. Preferably, the sheet, when unrolled, would be about 13.7 meters long by about 30.48 cm. wide. The runners 20-34 would preferably be spaced about 10.16 cm. apart and would each be about 2.54 cm. wide, between 2.54 cm. and 5.0 cm. thick and about 30.48 cm. long. These dimensions are preferred for the sake of economy of material and to allow the formed casing insulator 1 be used with a variety of pipe and casing sizes.

While specific embodiments of the invention have been shown and described, the invention should not be considered as so limited, but only as limited as set forth in the appended claims.

I claim:

1. A pipeline casing insulation system, comprising in combination:
   a coated pipe;
   a tubular metallic casing surrounding said coated pipe; and
   a pipeline casing insulator positioned between said coated pipe and said tubular metallic casing, said insulator comprising a flexible felt including a pair of opposed spaced, inner and outer facing surfaces separated the thickness of said belt and having a length such that said belt may be mounted on said pipe by circumferentially wrapping said belt around the outer coated surface of said pipe with said inner facing surface abutting the outer coated surface of said pipe;
   a plurality of runners mounted on said outer facing surface, each runner comprising a hardened casting formed from an insulative material, said runners substantially spaced in an array to support said pipe within said casing and to prevent the outer coated surface of said pipe from contacting the inner surface of said casing; and
   means for connecting said belt to said pipe.

2. The pipeline casing insulation system of claim 1 wherein each of said runners has an elongated bar-like configuration; and
   said runners are parallel to one another and are oriented in a transverse orientation of said belt.

3. The pipeline casing insulation system of claim 1 wherein said insulative material forming said runners is capable of bonding to said belt when in a plastic state; and
   said runners are cast directly onto said outer facing surface to mount said runners on said belt.

4. The pipeline casing insulation system of claim 3 wherein said belt material includes a strip of material capable of bonding to an organic resin; and
   said insulative material includes a polymer concrete that includes an organic resin and an aggregate.

5. The pipeline casing insulation system of claim 4 wherein said belt material comprises a strip of organic non-woven material.

6. The pipeline casing insulation system of claim 4 wherein said aggregate includes a mixture of a coarse particulate, substantially incompressible, material and a fine filler material.

7. The pipeline casing insulation system of claim 4 wherein said organic resin is a thermosetting polymer resin.

8. The pipeline casing insulation system of claim 7 wherein said thermosetting polymer resin is selected from the class consisting of epoxy, polyester, and polyurethane.

9. The pipeline casing insulation system of claim 6 wherein said substantially incompressible particulate material is sand or gravel; and
   said filler material is selected from the group consisting of calcium carbonate, silica flour, and kaolin.

10. The pipeline casing insulation system of claim 1 wherein said means for connecting said belt to said pipe comprises a mastic coating applied to said inner facing surface of said belt.

* * * * *